United States Patent
Hartmann et al.

[11] Patent Number: 5,938,160
[45] Date of Patent: Aug. 17, 1999

[54] CUPHOLDER APPARATUS FOR ATTACHMENT TO A SURFACE

[75] Inventors: Jerome Hartmann, Carlisle; Thomas R. Steinhagen, West Des Moines; Charles A. Haas, Des Moines, all of Iowa

[73] Assignee: Cobbs Manufacturing Company, Des Moines, Iowa

[21] Appl. No.: 08/876,632

[22] Filed: Jun. 16, 1997

[51] Int. Cl.[6] .................................................. F16M 13/00
[52] U.S. Cl. ...................... 248/311.2; 224/926; 248/214; 248/909
[58] Field of Search .................. 248/311.2, 909, 248/214, 314, 313; 224/926

[56] References Cited

U.S. PATENT DOCUMENTS

| | | | |
|---|---|---|---|
| 1,755,335 | 4/1930 | Roman . | |
| 2,215,411 | 9/1940 | Sebring | 248/313 |
| 4,530,480 | 7/1985 | Pratt | 248/311.2 |
| 4,629,153 | 12/1986 | Marcum | 248/311.2 X |
| 4,655,425 | 4/1987 | Wallace et al. | 248/311.2 |
| 4,697,780 | 10/1987 | Wenkman et al. | 248/558 |
| 4,738,423 | 4/1988 | DiFillippo et al. | 248/311.2 |
| 4,749,112 | 6/1988 | Harper | 248/311.2 X |
| 4,765,581 | 8/1988 | Wallace et al. | 248/311.2 |
| 4,779,831 | 10/1988 | Anderson | 248/311.2 |
| 4,844,400 | 7/1989 | Jasmagy, Jr. | 248/311.2 |
| 5,014,956 | 5/1991 | Kayali | 248/311.2 |
| 5,106,046 | 4/1992 | Rowles et al. | 248/311.2 |
| 5,112,017 | 5/1992 | Pang | 248/311.2 |
| 5,148,755 | 9/1992 | Morales | 248/311.2 X |
| 5,191,679 | 3/1993 | Harper | 248/311.2 X |
| 5,603,477 | 2/1997 | Deutsch | 248/311.2 |
| 5,651,523 | 7/1997 | Bridges | 248/311.2 |
| 5,782,448 | 7/1998 | Withun et al. | 248/311.2 |

*Primary Examiner*—Derek J. Berger
*Attorney, Agent, or Firm*—Dick and Harris

[57] ABSTRACT

A cupholder apparatus for attachment to a surface including a base member, a support member, a finger member and an attachment member. The support member extends upward from the base member. The finger member is associated with the support member and includes a first end capable of selective positioning. The attachment member is frangibly associated with the cupholder apparatus. The frangibility facilitates temporary or permanent attachment to, or onto, a surface.

6 Claims, 2 Drawing Sheets

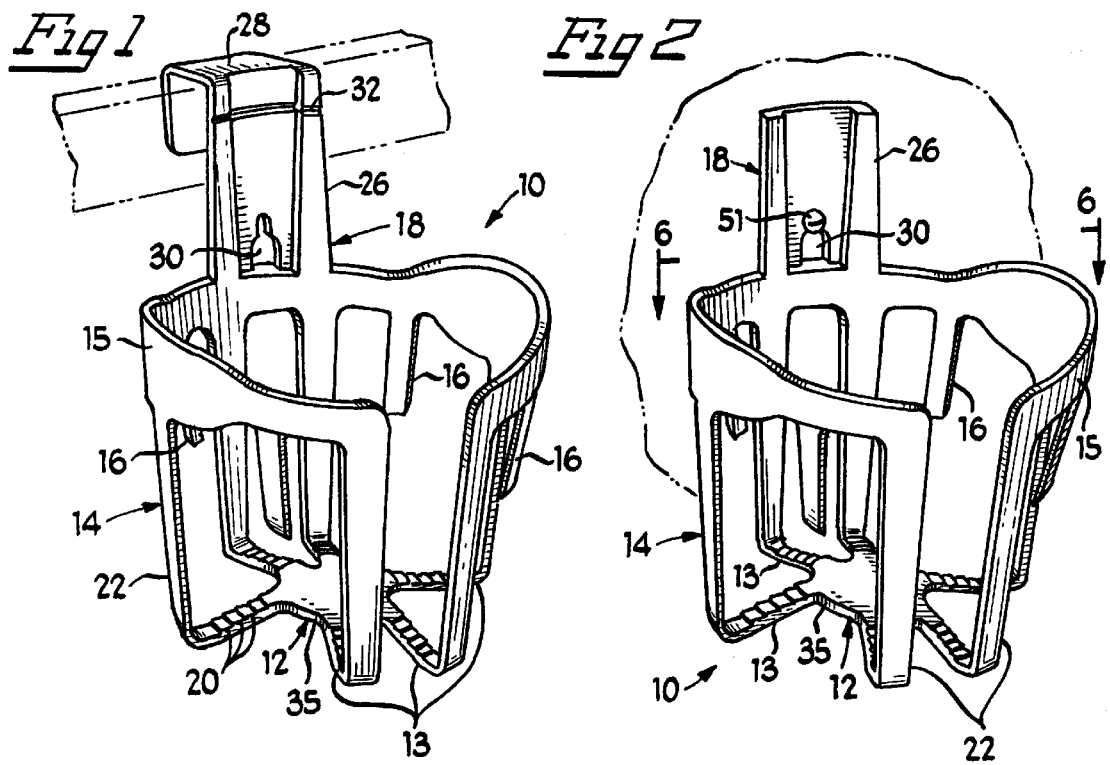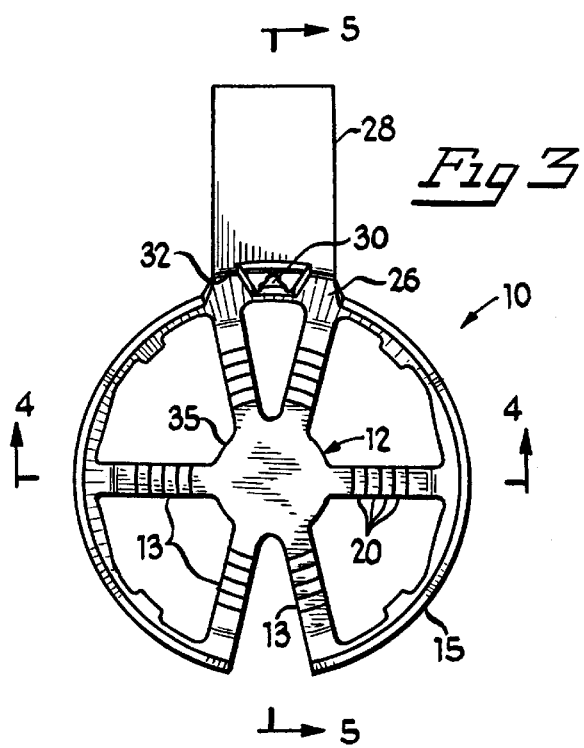

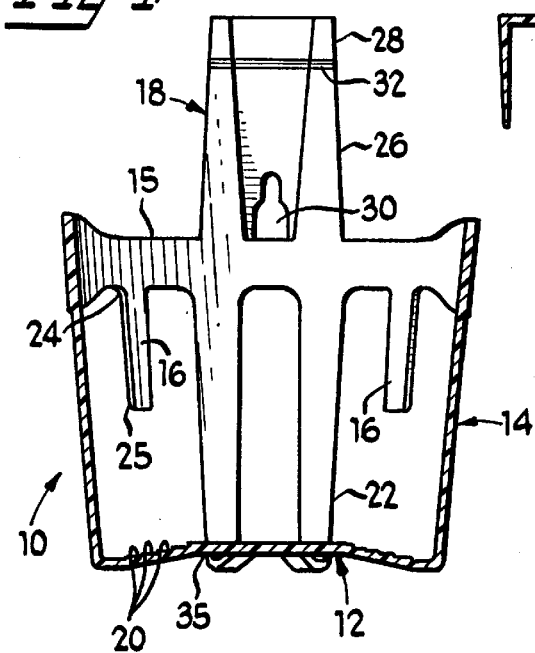
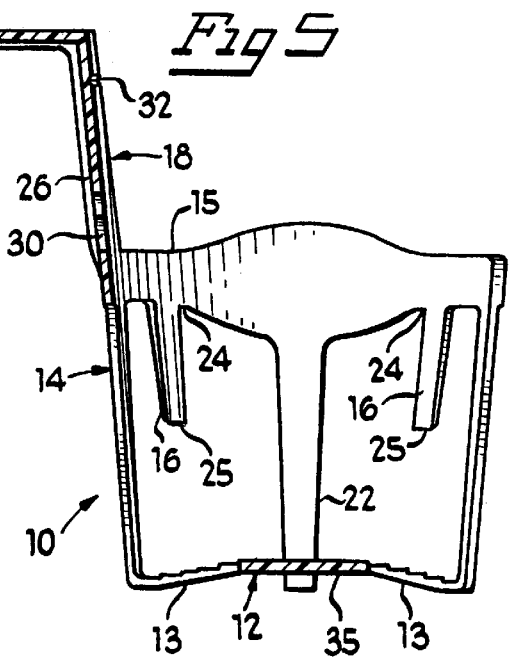
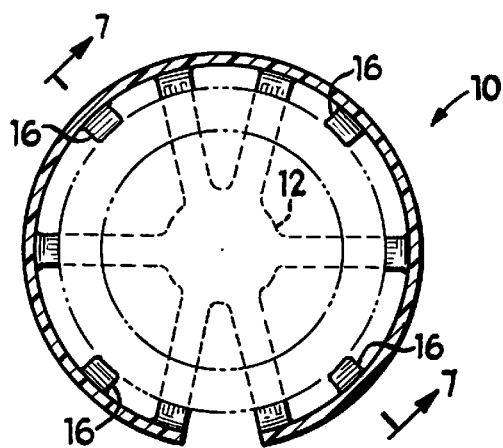
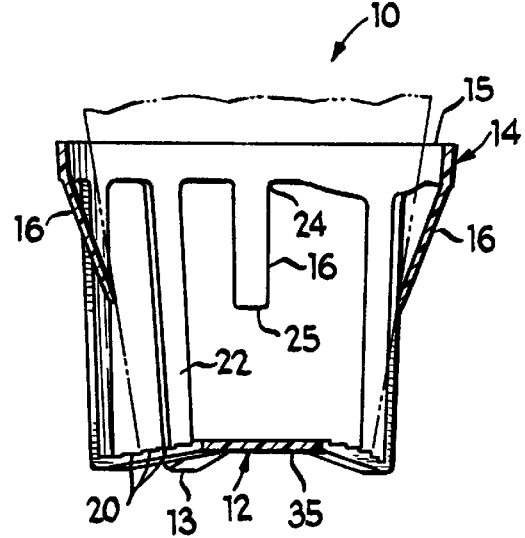

CUPHOLDER APPARATUS FOR ATTACHMENT TO A SURFACE

BACKGROUND OF THE INVENTION

1. Field of the Invention

The present invention relates to cup holding apparatuses, and, more particularly to a cupholder apparatus intended for temporary or permanent attachment to a surface, such as a window, door panel or dashboard of a vehicle.

2. Background Art

Articles, and in particular cupholders, for attachment to a surface, have been known in the art. These articles generally fall into two broad classes, the first class comprises articles for temporary attachment to a vehicle, and the second class comprises articles for permanent attachment to a vehicle.

The first class of cupholders is designed to be temporarily attached to a vehicle, such as a window sill or a door panel. While such cupholders may include attachment means for aide in securing the cup in place, none of these cupholders provide for the use of fingers which are manually bendable or formable into a desired shape to hold variously sized members. Moreover, these cupholders do not maintain such a formed, desired shape when a cup or other object is not positioned in the holder.

The second class of cupholder is designed to be attached directly to a vehicle, such as a dashboard or a console. These types of cupholders include a support bracket for attaching the overall structure to the surface. While such cupholders may include a support bracket for permanent attachment to a surface, none of the uncovered references include a handle which is frangible and, in turn, not reattachable to the base structure.

SUMMARY OF THE INVENTION

The present invention is directed to a cupholder apparatus for attachment to a surface. The apparatus includes a base member, a support member, at least one finger member and means for attachment to a surface. Each of the finger members are associated with the support member and include a first end capable of selective positioning.

In a preferred embodiment, the attachment means is frangibly associated with the base member. In such a preferred embodiment, the apparatus can be temporarily attached to, or onto, a surface. Additionally, the attachment portion can be broken free from the apparatus to, in turn, facilitate permanent attachment to, or onto, a surface.

In another preferred embodiment, the base member is substantially circular and includes a step-like feature.

Preferably, the finger members comprise a deformable material.

BRIEF DESCRIPTION OF THE DRAWINGS

FIG. 1 of the drawings is a front perspective view of the apparatus showing a first orientation of the attachment means;

FIG. 2 of the drawings is a front perspective view of the apparatus showing the second orientation of the attachment means;

FIG. 3 the drawings is a top plan view of the apparatus;

FIG. 4 of the drawings is a cross-sectional view of the apparatus taken generally along lines 4—4 of FIG. 3;

FIG. 5 of the drawings is a cross-sectional view of the apparatus taken generally along lines 5—5 of the FIG. 3;

FIG. 6 of the drawings is a cross-sectional view of the apparatus taken generally along lines 6—6 of FIG. 2; and FIG. 7 the drawings is a partial cross-sectional view of the apparatus taken generally along lines 7—7 of FIG. 6.

DETAILED DESCRIPTION OF THE DRAWINGS

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiment illustrated.

Apparatus 10 is shown in FIGS. 1 and 2 as including base member 12, support member 14, finger members 16 and attachment means 18. Apparatus 10 is preferably constructed as a single injection molded plastic member. However, the use of different materials, such as metals, composites and wood, among others, and different processes of construction are likewise contemplated.

Base member 12 is shown in FIGS. 1, 2, 3 and 7 as comprising central region 35 and outward protrusions 13. Each of protrusions 13 are angled downward away from central region 35. Further, each protrusion includes circularly-shaped step-like structures 20 disposed about each of protrusions 13 and concentric about central region 35. As will be explained, these step-like structures 20 facilitate acceptance of a cup, or other object, about the center.

Support member 14 is shown in FIGS. 1, 2, 4 and 5 as including arms, such as arm 22, and joining member 15. Each of arms 22 is associated with one of protrusions 13 and extends upward away from the protrusion. Collectively, the arms substantially encircle the base member 12, thereby providing a protective "cage" for a cup or other object. While six arms are shown, each extending upward from one of the six outward protrusions of the base member, any number of arms, of varying width and length, are likewise contemplated.

Joining member 15, as shown in FIGS. 1, 2, 4 and 5, encircles base member 12 and attaches to the arm members. Joining member 15 may be continuous or it may only join some of the arm members. Additionally, while joining member is shown as a substantially uniform band with slight variations, numerous other shapes and thicknesses are likewise contemplated.

Finger members, such as finger member 16, are shown in FIGS. 4, 5 and 7 as including first end 24 and second end 25. First end 24 is associated with joining member 15. Second end 25 extends downward toward base member 12. While apparatus 10 is shown as having four finger members 16 (FIGS. 1 and 2) placed symmetrically about joining member 15, it is likewise contemplated that only one finger member or a plurality of finger members be used. Furthermore, although finger member 16 is shown in FIG. 7 as being approximately one-half the length of arm 22, varying lengths (as well as widths) of finger members 16 are certainly contemplated.

Finger members 16 comprise a material that is substantially resilient to deformation yet, to an extent rigidly formable into many different orientations. Accordingly, the material does tend to resist plastic deformation and does have a certain resiliency. However, by application of increased force, it is possible to plastically deform the material into a new orientation. While many materials are contemplated, finger members may comprise a polypropolene plastic, or a bendable wire which may be encapsulated by plastic or rubber, among other types of materials.

Attachment means 18 is shown in FIGS. 1, 2, 4 and 5 as including a first member 26 and second member 28. First member 26 extends upward from support member 14, and includes an opening 30. Opening 30 is designed to accept fastener 51 (FIG. 2) which may comprise a hook or screw, or any number of other fasteners to anchor the apparatus 10 to a surface.

Second member 28 is shown in FIG. 5 as comprising a substantially C-shaped structure which can accept and hang from an outside surface, such as a window sill. Second member 28 is attached to first member 26 at frangible connection 32. The frangible connection 32 facilitates alternative separation and detachment of the first and second members.

In operation, it must first be determined whether apparatus 10 is to be permanently or temporarily attached to a surface. If apparatus 10 is to be temporary attached to a surface, for instance, attachment means 18 can be "hung" on or to the surface (FIG. 1). Again, such a surface can include a window sill or a door panel of a vehicle, among others. Specifically, the C-shaped second member is positioned over the surface. Inasmuch as it is merely hung, the apparatus can likewise easily be detached and repositioned as desired.

On the other hand, if apparatus is to be permanently attached to a surface, second member 28 is first detached from first member 26 about frangible connection 32 (FIG. 2). Next, a fastener, such as screw 51 is mounted onto the desired surface. Once the screw is positioned, it is extended through opening 30 of first member 26, to releasably anchor first member 26 to the surface.

Next, finger members 16 are manually positioned to more securely maintain the cup, or other object. Specifically, the finger members are plastically deformed inward or outward so that when a cup is positioned into the "cage", the finger members are forced into contact with the cup and, to an extent biased against the cup. Inasmuch as the finger members are deformable, the finger members can be forced inward or outward repeatedly until they retain the desired shape. In another embodiment wherein the finger members comprise a plastic material, it is likewise contemplated that the apparatus be placed into boiling water to first soften the finger members which further facilitates the inward or outward repositioning of same. Upon removal from the water, the finger members can then be readily formed into a desired orientation. As the apparatus, and, in turn, the finger members cool, the finger members will retain their orientated configuration.

In addition, most cups, or other objects, fit one of the predetermined steps in step-like structure 20 which further "grips" the cup and assists the proper positioning of the cup. Moreover, the "cage" formed by the arms and the joining member provides additional support for a cup, or other object, should finger members 16 plastically deform as a result of a vehicle's sudden turn or stop.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A cupholder apparatus for attachment to an outside surface comprising:

a base member;

a support member extending upward from the base member;

means for attachment to the outside surface, the attachment means including a first member and a second member, the first member extending upward from the support member and further including an opening for accepting a fastener for anchoring the apparatus to the outside surface;

a frangible connection between the first and second members, the frangible connection facilitating alternative separation and detachment of the first and second members; and the second member includes a first, a second and a third section, the first section extending upward from the first member, the second section extending outward from the first section at a substantially right angle, and the third section extending downward from the second section at a substantially right angle, so as to allow the first and third sections to be in substantially parallel relationship.

2. The cupholder apparatus according to claim 1 wherein the base member is substantially circular.

3. A cupholder apparatus for attachment to an outside surface comprising:

a base member having a step-like structure, including a central region having a periphery and a plurality of protrusions, each of the plurality of protrusions extending outward and angling downward from the periphery of the central region, the step-like structure including a plurality of downwardly descending steps disposed about each of the plurality of protrusions and concentric about the central region, the steps allowing the cupholder to grip different sized objects placed into the cupholder;

a support member extending upward from the base member;

at least two finger members operably associated with the support member, the at least two finger members operably positioned to center an object about a central region of the base member, the at least two finger members each including a first end capable of selective positioning;

means for attachment to the outside surface, the attachment means including a first member and a second member, the first member extending upward from the support member and further including an opening for accepting a fastener for anchoring the apparatus to the outside surface;

a frangible connection between the first and second members, the frangible connection facilitating alternative separation and detachment of the first and second members; and the second member includes a first, a second and a third section, the first section extending upward from the first member, the second section extending outward from the first section at a substantially right angle, and the third section extending downward from the second section at a substantially right angle, so as to allow the first and third sections to be in substantially parallel relationship.

4. A cupholder apparatus for attachment to an outside surface comprising:

a base member;

a support member extending upward from the base member;

at least two finger members operably associated with the support member, the at least two finger members operably positioned to center an object about a central region of the base member, the at least two finger members each including a first end capable of selective positioning;

means for attachment to the outside surface, the attachment means including a first member and a second member, the first member extending upward from the support member and further including an opening for accepting a fastener for anchoring the apparatus to the outside surface;

the attachment means is frangibly associated with the base member by a frangible connection between the first and second members, the frangible connection facilitating alternative separation and detachment of the first and second members; and the second member includes a first, a second and a third section, the first section extending upward from the first member, the second section extending outward from the first section at a substantially right angle, and the third section extending downward from the second section at a substantially right angle, so as to allow the first and third sections to be in substantially parallel relationship.

5. A cupholder apparatus for attachment to an outside surface comprising:

a base member;

a plurality of arms extending upward from the base member;

a joining member connecting at least two of the plurality of arms distal from the base member;

at least one finger member operably associated with the support member and depending from the joining member;

the at least one finger member including a first end, distal from the joining member, capable of selective positioning;

means for attachment to the outside surface, the attachment means including a first member and a second member, the first member extending upward from the support member and further including an opening for accepting a fastener for anchoring the apparatus to the outside surface;

a frangible connection between the first and second members, the frangible connection facilitating alternative separation and detachment of the first and second members; and the second member includes a first, a second and a third section, the first section extending upward from the first member, the second section extending outward from the first section at a substantially right angle, and the third section extending downward from the second section at a substantially right angle, so as to allow the first and third sections to be in substantially parallel relationship.

6. The cupholder apparatus according to claim 5 wherein:

the base member includes a central region having a periphery and a plurality of protrusions, each of the plurality of protrusions extending outward and angling downward from the periphery of the central region; and each of the plurality of protrusions includes downwardly descending steps disposed about each of the plurality of protrusions and concentric about the central region, the steps further allowing the cupholder to grip different sized objects placed into the cupholder.

* * * * *

UNITED STATES PATENT AND TRADEMARK OFFICE
CERTIFICATE OF CORRECTION

PATENT NO. : 5,938,160
DATED : August 17, 1999
INVENTOR(S) : Hartmann et al.

It is certified that error appears in the above-identified patent and that said Letters Patent is hereby corrected as shown below:

Col. 1, Line 62    After "Fig. 3" insert --of--.

Col. 2, Line 3     After "Fig. 7" insert --of--.

Signed and Sealed this

Twenty-seventh Day of March, 2001

*Attest:*

NICHOLAS P. GODICI

*Attesting Officer*    *Acting Director of the United States Patent and Trademark Office*